April 7, 1931.  H. FORD  1,799,292
BRAKE
Filed June 30, 1928
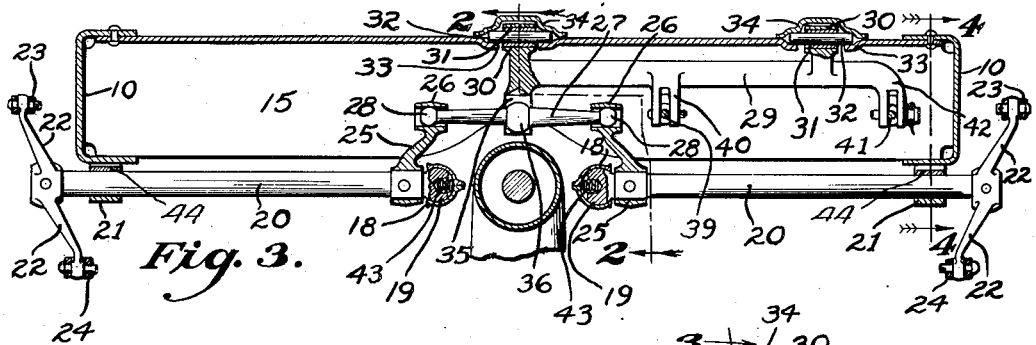
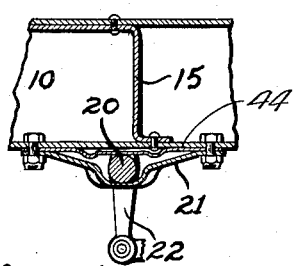
Fig. 4.
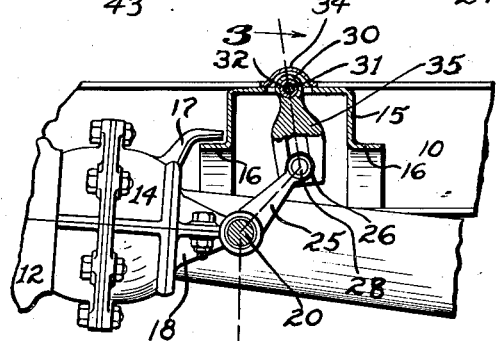
Fig. 2.
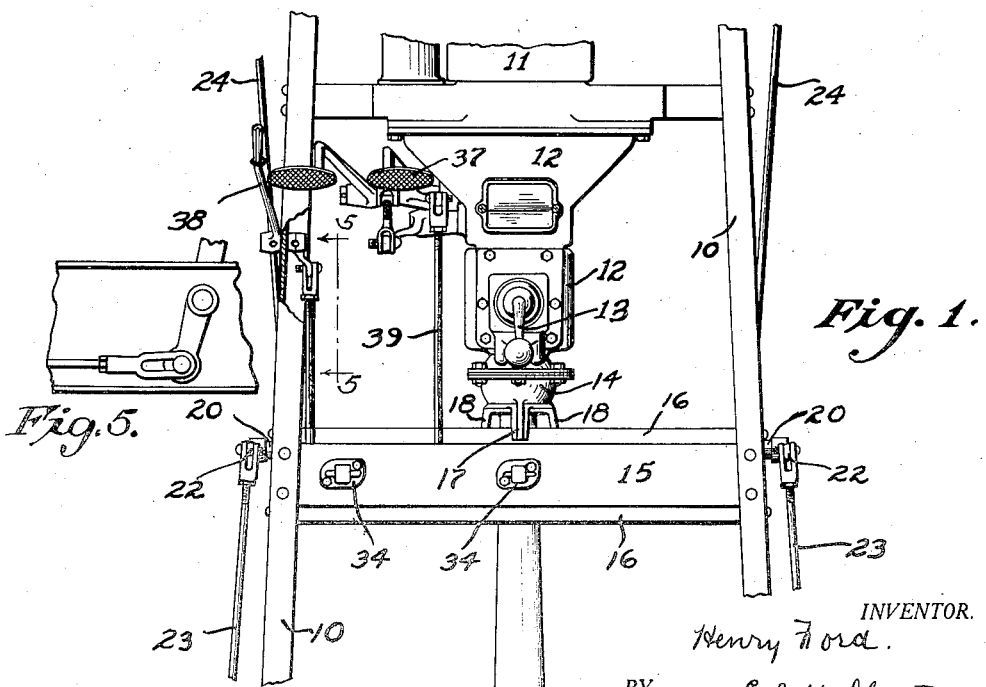
Fig. 1.
Fig. 5.
INVENTOR.
Henry Ford.
BY C. R. Halbert,
E. L. Davis.
ATTORNEYS.

Patented Apr. 7, 1931

1,799,292

UNITED STATES PATENT OFFICE

HENRY FORD, OF DEARBORN, MICHIGAN, ASSIGNOR TO FORD MOTOR COMPANY, OF DEARBORN, MICHIGAN, A CORPORATION OF DELAWARE

BRAKE

Application filed June 30, 1928. Serial No. 289,445.

The object of my invention is to make a brake of simple, durable and inexpensive construction.

Still a further object of my invention is to provide an equalizer mechanism for a brake.

Still a further object of my invention is to provide means for selectively and independently applying a brake by either of two control levers or pedals.

Still a further object of my invention is to provide a combined equalizer and dual control structure for use in connection with four wheel brakes for an automobile.

Still a further object of my invention is to provide a structure such that the brake applying parts will be as nearly as possible symmetrical for each brake whereby the pressure applied to each brake may be as uniform as possible.

With these and other objects in view, my invention consists in the arrangement, construction, and combination of the various parts of my improved device, as described in the specification, claimed in the claims and illustrated in the accompanying drawings, in which Figure 1 shows a top or plan view of a portion of an automobile frame having my improved device installed thereon.

Figure 2 shows a vertical longitudinal enlarged central sectional view through the device shown in Figure 1.

Figure 3 shows a sectional view taken on the line 3—3 of Figure 2, and

Figure 4 shows a sectional view taken on the line 4—4 of Figure 3.

Figure 5 shows an elevation taken on the line 5—5 of Figure 1.

Referring to the accompanying drawings I have used the reference numeral 10 to indicate the side frame members of an automobile. An engine 11 is mounted on this frame in any ordinary manner, this engine having the transmission 12 and the shift lever 13 formed as a unit therewith. An ordinary universal housing 14 is disposed at the rear of this engine.

A frame cross member 15 of channel section is extended between the frame members 10 just rearwardly of the universal housing 14. This channel frame member 15 has a horizontal flange 16 at either edge thereof which forms a reinforcement therefor. It is my intention to use this cross frame member to house the brake operating mechanism including the equalizer and connections from the pedal and hand lever whereby said parts may be both supported and protected by this frame cross member 15.

The universal housing 14 has three arms extending rearwardly therefrom, the upper central arm 17 being so arranged that it rests directly above the flange 16 at the forward central part of the frame cross member 15 and the other two arms 18 extending rearwardly at either side of the universal joint and approximately horizontally level with the center thereof. These arms 18 have an outwardly facing ball socket bearing 19 formed at their rear ends to provide a universal bearing for the two brake operating rockshafts 20.

The outer end of these brake operating shafts 20 are journaled in the brackets or straps 21 which are illustrated in detail in Figure 4. These straps have an offset portion at their centers which co-act with the frame members 10 to form an elongated slot in which the outer ends of these shafts 20 are rotatably and slidably mounted. A leaf spring 44 is disposed between the bracket 21 and the frame member 10 whereby the rockshaft 21 may be held from rattling.

Arms 22 extend in opposite directions from the outer ends of the rockshaft 20, the upper arms 22 having their ends connected with brake rods 23 which in turn are connected to the rear wheel brakes of an automobile. The lower arms are connected with rods 24 which in turn are connected with the front wheel brakes of an automobile.

An arm 25 extends upwardly from the inner ends of each of the rockshafts. These arms are provided with elongated openings or sleeves 26. The cross beam 27 of the equalizer structure is provided with balls 28 at each end thereof which fit in these sleeves 26 whereby the equalizer beam 27 may operate to compensate for irregularity of movement required to apply the different brakes on the vehicle. A brake applying rockshaft 29 is journaled in the frame member 15 with its axis parallel to the axes of the shafts 20. The shaft 29 is provided with spaced upwardly extending ears 30 which have bearing sleeves 31 therein. Pins 32 extend through these bearing sleeves 31 in the ears 30. These ears 30 extend upwardly through slots in the top of the frame member 15 and this frame member is provided with little dents 33 at each end of these slots to form a half bearing for the pins 32. Bearing caps 34 are screwed down over the pins 33 to form the second half of the bearings for the pins 32 and cover the slots in the frame member 15.

The shaft 29 is provided with an arm 35 at its inner end which has a slot in its lower end to receive a ball 36 at the center of the equalizer beam 27.

A foot pedal 37 is journaled on the transmission housing 12 and a hand lever 38 is journaled nearby on one of the frame members 10. A rod 39 connects the foot pedal 37 with the lower end of a forked arm 40 which extends downwardly from about the center of the rockshaft 29.

The hand lever 38 is connected through the rod 41 with a forked arm 42 which extends downwardly from the outer end of the shaft 29. It will thus be seen that either the foot pedal 37 or the hand lever 38 will oscillate the shaft 29 to rock the shaft 20 to thereby operate the brakes on the vehicle from either the foot brake or the hand lever. Means may be provided if desired for making it possible to operate the brakes by either the hand lever or the foot pedal without moving the position of the other as by slotting the rods 39 and 41 to permit movement of said rods independently of each other.

The inner ends of the rockshaft where they are received in the ball sockets 19 are provided with a drilled opening in which the spring 43 is mounted so that the engagement between the ball end of the shafts 20 and the ball seat 19 may be positive at all times and no rattle will occur.

Among the many advantages arising from the use of my improved device, it should be specifically noted that the four brakes of a vehicle may be applied with an equalized pressure. Still a further advantage results in the fact that these brakes may be applied by either the foot pedal or the hand lever, as desired.

Still a further advantage results from the fact that I am enabled to secure this equalized application of the brakes with two aligned rockshafts whereby the brake operating mechanism may be housed within the frame cross member thereby saving room and making the installation simple and efficient. Still a further advantage results from the use of the operating shaft 29 which is readily assembled within the cross frame member and which enables me to apply the force of the hand lever or foot pedal midway between the ends of the rockshafts 20 so that each of these shafts will twist the same amount in applying the brake and the application of the brake will therefore be more uniform. Still a further advantage results from the fact that this equalizer structure automatically lends itself to carrying the brake operating mechanism up over the driveshaft of the vehicles so that it may clear the latter.

Some changes may be made in the arrangement, combination and construction of the various parts of my improved device without departing from the spirit of my invention and it is my intention to cover by my claims such changes as may reasonably be included within the scope thereof.

I claim as my invention:

1. In a device of the character described, a frame, a frame cross member, a pair of substantially aligned rock shafts extending outwardly beneath the cross member and having their inner ends spaced from the center of said cross member, a drive shaft extending at right angles beneath the cross member and intersecting the prolonged axes of the rock shafts, means for mounting the outer ends of the rock shafts to permit horizontal and rotary motion, means for mounting the inner ends of the rock shafts to permit universal movement, arms extending upwardly from the inner ends of the rock shafts, and an equalizer beam connecting the upper ends of the arms so as to bridge the drive shaft.

2. In a device of the character described, a frame, an engine having a universal joint housing mounted in said frame, a frame cross member, a pair of substantially aligned rock shafts having their inner ends mounted for universal movement in said universal joint housing and extending outwardly beneath the cross member, an arm extending upwardly from each rock shaft adjacent to said universal joint housing, a drive shaft extending rearwardly from said universal joint housing beneath the cross member and intersecting the prolonged axes of the rock shafts, and an equalizer beam connecting the upper ends of each arm so as to bridge the drive shaft.

3. In a device of the character described, a frame, a frame cross member, an engine having a universal joint housing mounted in said frame member, a pair of substantially aligned rock shafts having their inner ends mounted for universal movement in the universal joint housing and extending outwardly beneath the cross member, a torque tube extending at right angles beneath the cross member and intersecting the prolonged axes of the rock shafts, an equalizer beam extending above the torque tube, and means connecting each end of the equalizer beam with the respective end of the rock shafts so as to bridge the torque tube.

4. In a device of the character described, a frame, a pair of substantially aligned rock shafts, means for mounting the inner ends of said rock shafts to permit universal movement, a bracket co-acting with the lower side of said frame to permit rotary and limited longitudinal movement of said cross shaft, and hardened leaf springs interposed between the rock shafts and frame member to prevent rattle and vibration of the parts and to form improved bearing surfaces for the outer ends of said shafts.

5. In a device of the character described, a frame, a pair of substantially aligned rock shafts, means for mounting the outer ends of the rock shafts to permit both rotary and longitudinal movement thereof relative to the frame, a pair of ball sockets mounted on the frame having the inner ends of said rock shafts universally mounted therein, and a coil spring interposed between the ball and socket to prevent rattle and vibration of the parts.

6. In a device of the character described, a frame, an engine having a universal joint housing mounted in said frame, a pair of ball sockets secured to said universal joint housing, a pair of substantially aligned rock shafts having ball shaped inner ends mounted in said sockets, an axial bore in said ball ends, and a coil spring disposed in said bore and co-acting with said sockets to prevent rattle and vibration of the parts.

June 23, 1928.

HENRY FORD.